United States Patent
Kato

(10) Patent No.: US 6,249,850 B1
(45) Date of Patent: *Jun. 19, 2001

(54) SEMICONDUCTOR MEMORY DEVICE AND METHOD FOR COPYING DATA STORED THEREIN

(75) Inventor: Hideo Kato, Kawasaki (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,930

(22) Filed: Aug. 8, 1997

(30) Foreign Application Priority Data

Aug. 8, 1996 (JP) .................................................. 8-209827

(51) Int. Cl.[7] ........................................................ G06F 12/14
(52) U.S. Cl. ................................................. 711/163; 714/711
(58) Field of Search ............................... 705/1; 365/200, 365/210, 230, 189; 714/711, 766, 804, 805; 360/60, 27; 711/163; 713/200

(56) References Cited

U.S. PATENT DOCUMENTS

| 4,583,196 | * | 4/1986 | Koo ....................................... 713/200 |
| 4,768,193 | * | 8/1988 | Takemae ............................... 714/711 |
| 4,843,026 | * | 6/1989 | Ong et al. ............................. 438/130 |
| 5,003,410 | * | 3/1991 | Endoh et al. ........................... 360/60 |
| 5,761,139 | * | 6/1998 | Shibata et al. ........................ 365/200 |
| 5,796,943 | * | 8/1998 | Fujioka ............................. 395/188.01 |

FOREIGN PATENT DOCUMENTS

| 1173244 | 7/1989 | (JP) . |
| 242551 | 2/1990 | (JP) . |
| 474240 | 3/1992 | (JP) . |
| 7262000 | 10/1995 | (JP) . |

* cited by examiner

Primary Examiner—Robert W. Downs
(74) Attorney, Agent, or Firm—Hogan & Hartson, LLP.

(57) ABSTRACT

A mask ROM includes electrically programmable redundancy cells. Error data is stored in non-use cells among the redundancy cells and access inhibition addresses are attached to the non-use cells in which the error data is stored. If illegal copying is effected by sequentially incrementing the address of the mask ROM, the redundancy cell is accessed and the error data is output when the access inhibition address is accessed.

2 Claims, 4 Drawing Sheets

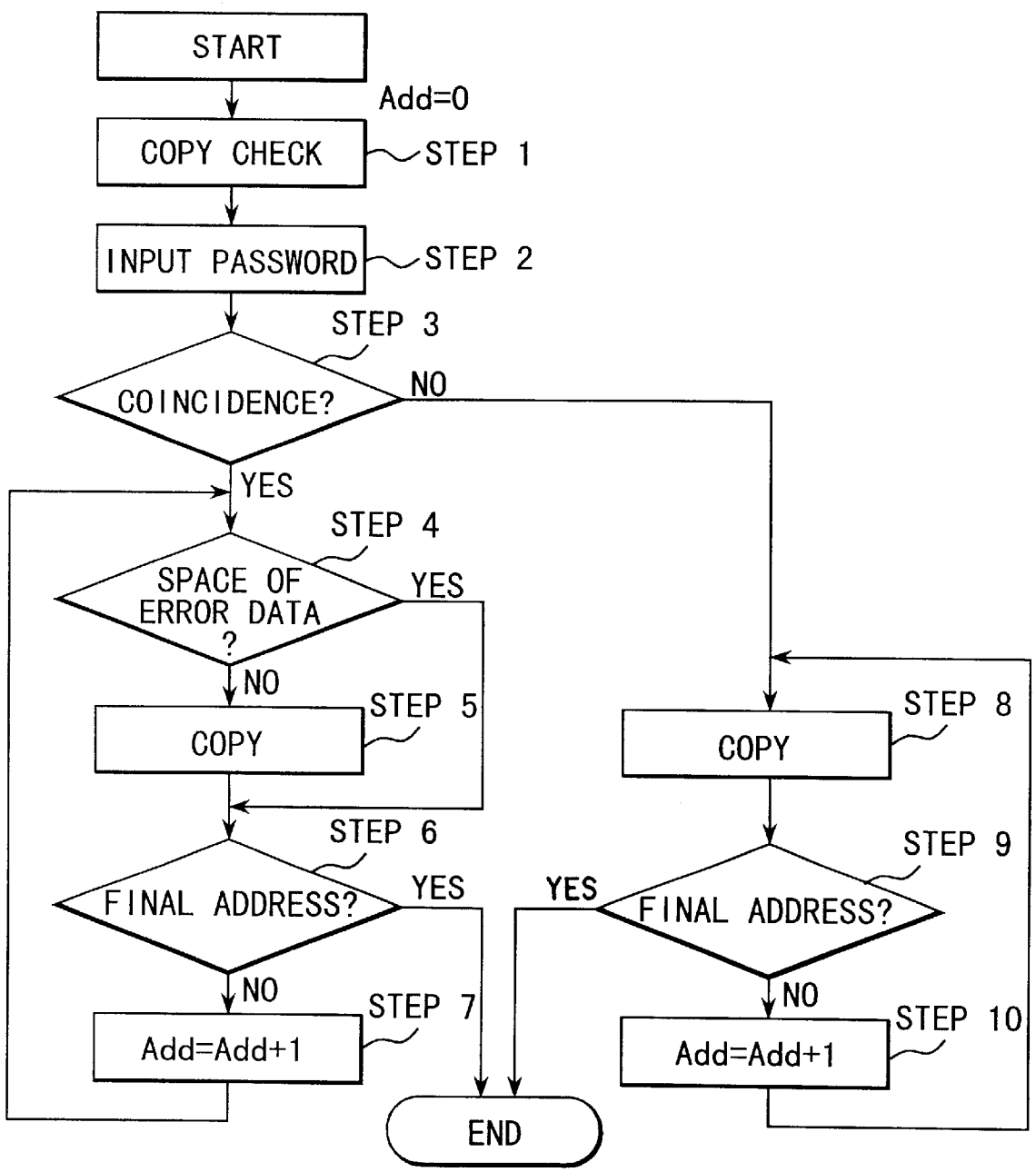
F I G. 4

SEMICONDUCTOR MEMORY DEVICE AND METHOD FOR COPYING DATA STORED THEREIN

BACKGROUND OF THE INVENTION

This invention relates to a semiconductor memory device having a protecting function against illegal copying, and more particularly to an electrically programmable mask ROM having redundancy cells and a method for protecting the same from illegal copying.

The memory cell array of a semiconductor memory device, for example, a mask ROM (Read Only Memory) is constructed by arranging memory cells formed of MOS transistors in a matrix form, connecting the gates of the memory cells on each row to a corresponding one of a plurality of word lines extending in the row direction, connecting the drains of the MOS transistors on each column to a corresponding one of a plurality of bit lines extending in the column direction, and grounding the sources of the MOS transistors. As a method for writing data into the memory cell, (a) a diffusion layer programming system, (b) ion-implantation programming system, (c) contact programming system and the like are known, information of "0", "1" is set to correspond to the presence or absence of a MOS transistor, the depletion type or enhancement type of a MOS transistor, or the presence or absence of a contact hole, and data is written by using a photomask in the course of the manufacturing process. The operation of reading out stored data is effected by selecting and charging one of the bit lines, selecting one of the word lines and setting the same to a high potential level, and determining "0" or "1" of stored information according to whether or not the bit line is discharged via a MOS transistor (memory cell) which is connected to both of the selected bit line and selected word line.

Generally, in the above mask ROM, redundancy cells which are used instead of defective memory cells when the defective memory cells are present are provided to relieve the memory. The redundancy cell is constructed by an electrically programmable memory element and data for the defective memory cell is stored therein. When the defective cell is accessed, data is read out from the redundancy cell instead of the defective cell, thus compensating for the defect of the cell.

However, with the above construction, data stored in the memory cell array can be easily read out by sequentially incrementing the ROM address by use of a ROM writer or personal computer. Therefore, there occurs a problem that the stored data can be easily copied by writing readout data into a storage medium such as a hard disk or floppy disk.

Therefore, various types of circuits and copy protect methods for providing a protect function against the illegal copying are proposed. For example, the techniques disclosed in Jap. Pat. Appln. KOKAI Publications Nos. 1-173244, 2-42551, 4-74240 and 7-262000 are known. However, if an attempt is made to attain a sufficient protection effect, a problem that the circuit scale is increased occurs.

BRIEF SUMMARY OF THE INVENTION

Accordingly, a first object of this invention is to provide a semiconductor memory device capable of protecting stored data from illegal copying without causing an increase in the circuit scale and chip occupancy area.

Further, a second object of this invention is to provide a stored data copying method for a semiconductor memory device, for making copied data substantially invalid even if stored data is copied by illegal means.

The first object of this invention can be attained by a mask ROM comprising memory cells in which data items are written by use of a mask; electrically programmable redundancy cells, data to be written into defective memory cells being written in respective ones of the redundancy cells when the defective memory cells are present and error data being stored in non-use cells among the redundancy cells; access means for accessing the redundancy cell in which the error data is written when one of access inhibition addresses is accessed; and output means for outputting the error data from the redundancy cell accessed by the access means.

Further, the first object of this invention can be attained by a semiconductor memory device comprising a memory cell array having data previously stored therein; first access means for accessing the memory cell array; output means for amplifying and outputting data read out from a memory cell accessed by the first access means; redundancy cells selectively used instead of defective cells to compensate for the defects of the defective cells when the defective cells are present in the memory cell array; and second access means for accessing the redundancy cell instead of the defective cell when the address of the defective cell is accessed; wherein error data is written into non-use cells among the redundancy cells, the addresses of the second access means corresponding to the non-use cells in which the error data is written are set as access inhibition addresses, and the error data written in the non-use cell is output from the output means when the access inhibition address is accessed.

With the above construction, since the protect function is realized by use of the non-use cells among the redundancy cells, the stored data can be protected from illegal copying without increasing the circuit scale and chip occupancy area. Further, since true data and error data are output in a mixed form when the access inhibition address is accessed, readout data cannot be substantially utilized even if the stored data is copied.

The second object of this invention is attained by an illegal copying preventing method for a mask ROM having electrically programmable redundancy cells, comprising the steps of writing error data into non-use cells of the redundancy cells; attaching access inhibition addresses to the respective non-use cells in which the error data is written; and outputting the error data from the redundancy cell when the access inhibition address is accessed.

The second object of this invention is attained by a copying method for copying stored data in a semiconductor memory device which has a memory space including a first area in which a starting program for starting the copying process is written, a second area in which an application software is written, and a third area in which a data base is written, and a redundancy space including a first area in which error data is stored in a non-use area and a second area in which a password and a space address of error data are stored in the non-use area; and in which an address in the first area of the memory space is attached to the password and the space address of the error data in the redundancy space and an address in the third area of the memory space is attached to the error data; comprising a first step of starting the program for copying and effecting the initialization and copy checking processes; a second step of inputting a password; a third step of determining whether or not the input password coincides with a previously stored password; a fourth step of determining whether or not an address to be accessed corresponds to the space of the error data when it is determined in the third step that the passwords coincide with each other; a fifth step of effecting the copying operation when it is determined in the fourth step that the address does not correspond to the space of the error data; a sixth step of determining whether or not the address is a final address when it is determined in the fourth step that the address corresponds to the space of the error data or after the copying operation of the fifth step is terminated and terminating the copying process when the address is detected to be a final address; a seventh step of incrementing the address by "1" when it is determined in the sixth step that the address is not a final address and returning the process to the fourth step; an eighth step of effecting the copying operation when it is determined in the third step that the passwords do not coincide with each other; a ninth step of determining whether or not the address of data copied in the eighth step is a final address and terminating the copying process when the address is detected to be a final address; and a tenth step of incrementing the address by "1" when it is determined in the ninth step that the address is not a final address and returning the process to the eighth step.

With the above copying method, the manufacturers and proper users can selectively copy only true data, but if an attempt is made to perform the illegal copying by inputting an erroneous password or by use of a ROM writer or personal computer, true data and error data are output in a mixed form so that the copied data cannot be substantially utilized even if the stored data is copied.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flowchart for illustrating a regular copying method of the memory space shown in FIG. 3;

DETAILED DESCRIPTION OF THE INVENTION

Figure 1:
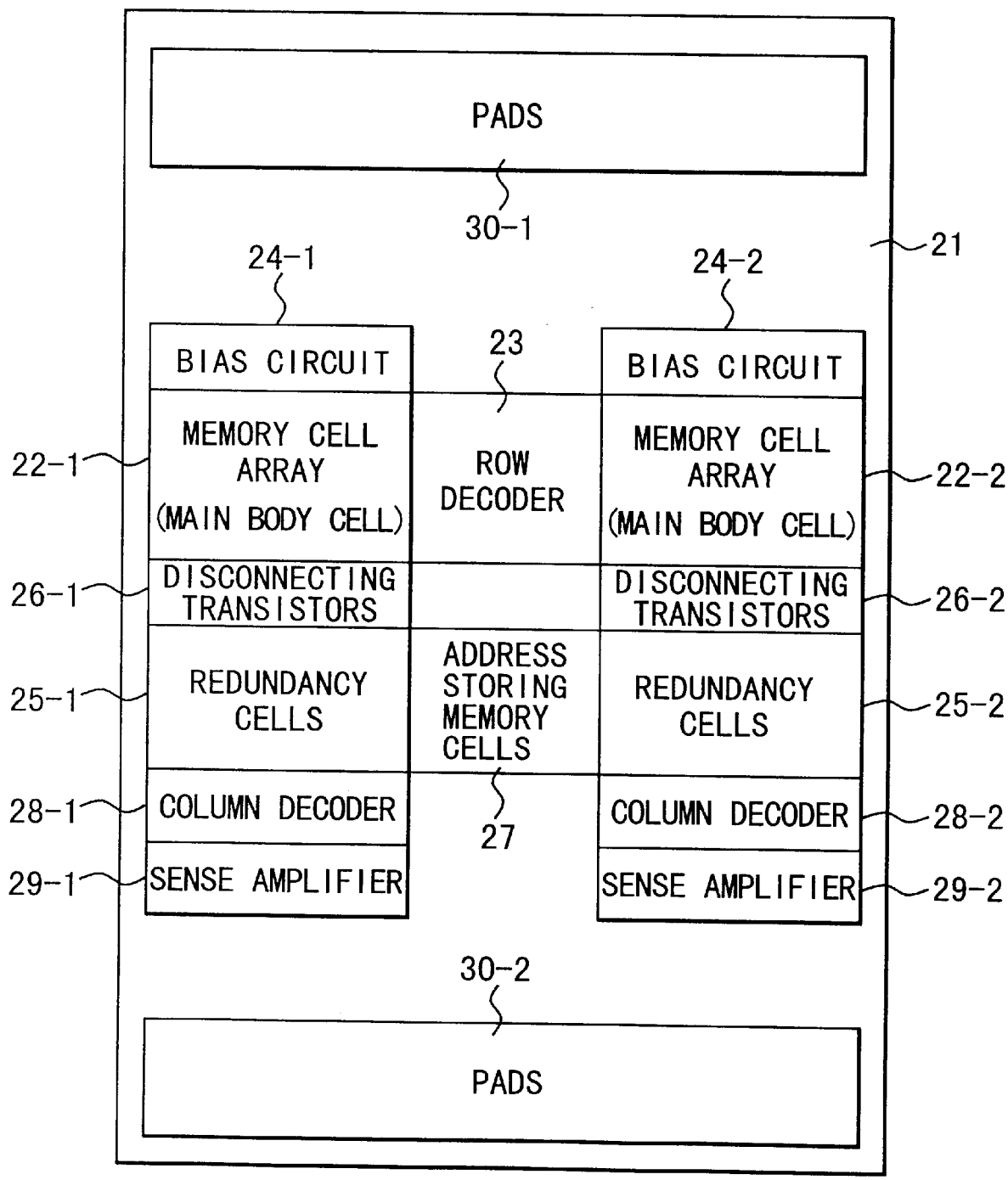
FIG. 1 is a diagram schematically showing a floor plan, for illustrating a semiconductor memory device according to one embodiment of this invention.

FIG. 1 shows a floor plan of a semiconductor memory device according to one embodiment of this invention. On a semiconductor chip 21, first and second memory cell arrays (main memory cells) 22-1, 22-2 are arranged and a row decoder 23 is arranged between the memory cell arrays 22-1 and 22-2. First and second bias circuits 24-1, 24-2 for charging bit lines are respectively connected to the memory cell arrays 22-1, 22-2. First and second redundancy cells 25-1, 25-2 used instead of defective cells when the defective cells are present are arranged in position adjacent to the memory cell arrays 22-1, 22-2. First and second disconnecting transistors 26-1, 26-2 for electrically disconnecting the defective cells are provided between the redundancy cells 25-1, 25-2 and the memory cell arrays 22-1, 22-2. Address storing memory cells 27 for storing addresses of the replaced cells are disposed in an area between the redundancy cells 25-1 and 25-2.

Further, first and second column decoders 28-1, 28-2 and first and second sense amplifiers 29-1, 29-2 are arranged in position adjacent to the redundancy cells 25-1, 25-2. First and second pads 30-1, 30-2 are formed to extend along the opposite two sides of the chip 21 with the above memory disposed therebetween.

With the above construction, when defects are present in the memory cell arrays 22-1 and 22-2, memory cells connected to word lines corresponding to the addresses of the defects are electrically disconnected by use of the disconnecting transistors 26-1, 26-2 and data items which are the same as data items stored in the electrically disconnected memory cells are electrically written in the redundancy cells 25-1, 25-2. Further, the addresses of the defective memory cells are electrically written into the address storing memory cells 27. When the defective cell in the memory cell arrays 22-1 and 22-2 is accessed, a corresponding one of the redundancy cells 25-1, 25-2 is accessed instead of the defective cell and data is read out from the accessed redundancy cell, and thus the defective cell can be replaced by the redundancy cell and the defect of the memory cell can be compensated for.

Further, in this invention, error data is written in non-use cells among the redundancy cells 25-1, 25-2 (cells which are not used for redundancy among the redundancy cells 25-1, 25-2, such non-use redundancy cells are present when the number of defective cells is small) and access inhibition addresses are set for the addresses of the address storing memory cells 27 corresponding to those of the redundancy cells 25-1, 25-2 in which the error data is written. When the access inhibition address is accessed, the error data is output from a corresponding one of the redundancy cells 25-1, 25-2.

Figure 2:
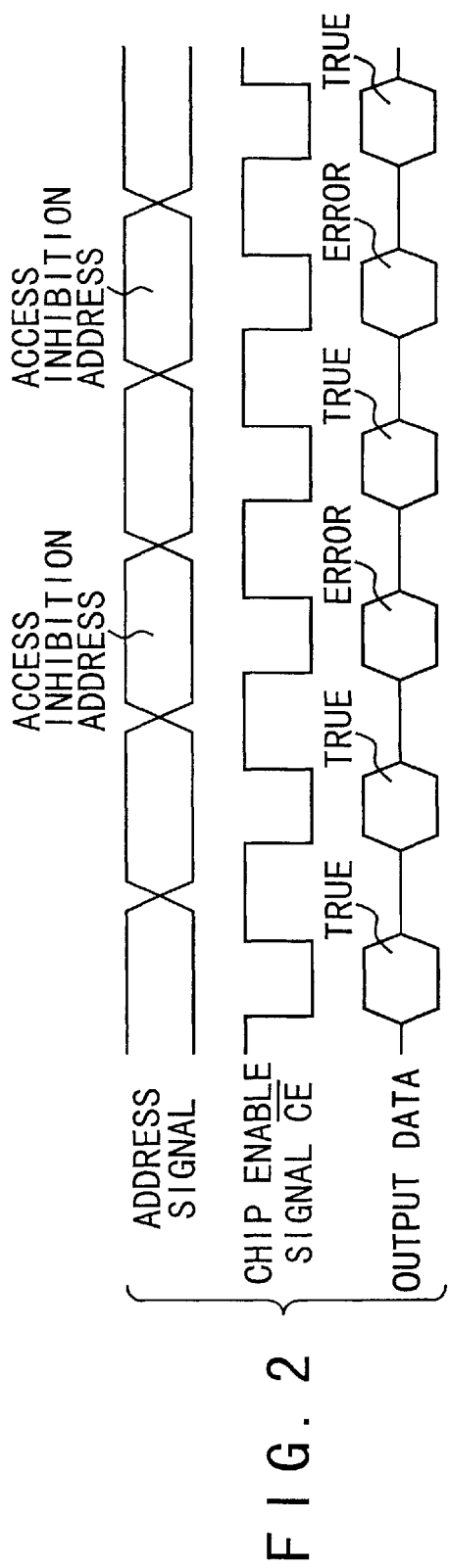
FIG. 2 is a flowchart for illustrating the operation when the stored data of the semiconductor memory device shown in FIG. 1 is illegally copied.

Normally, when an attempt is made to illegally copy data stored in a ROM, a ROM writer or personal computer is used to sequentially increment the address of the ROM so as to read out data and write the readout data into a storage medium such as a hard disk or floppy disk. The access inhibition address is not known to a person who is copying. If the access inhibition address is accessed during the copying operation, true data and error data are output in a mixed form from the semiconductor chip 11 as shown in FIG. 2. Therefore, the normal operation cannot be attained by use of the copied data and thus the copied data cannot be effectively used even if the stored data is copied. As a result, the stored data of the ROM can be substantially protected from illegal copying.

Further, since the access inhibition address and error data can be electrically written, a desired access inhibition address and desired error data can be freely set and can be changed for each chip. Thus, since a complicated protect function can be attained, it takes a lot of labor for a person who illegally copies the stored data to analyze the data.

In addition, since the non-use cells among the redundancy cells which are originally contained in the ROM are utilized, the circuit scale is not increased, and an increase in the circuit scale can be suppressed to minimum even when additional redundancy cells for protect function are previously provided.

Figure 3:
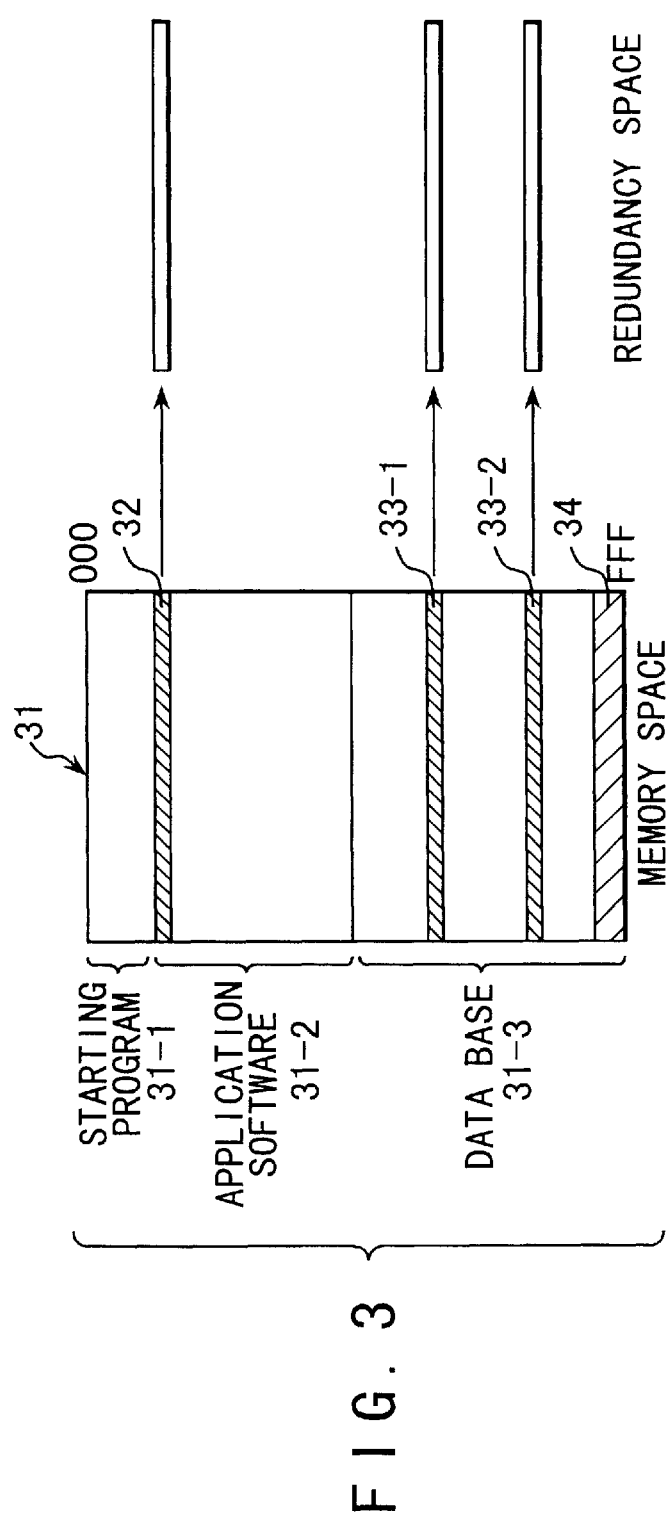
FIG. 3 is a diagram showing a memory space, for illustrating a method for copying the stored data in a semiconductor memory device according to one embodiment of this invention.

FIG. 3 is a diagram for illustrating a method for copying the stored data in a semiconductor memory device according to one embodiment of this invention and shows a memory space. The memory space 31 includes an area 31-1 in which a program for starting the copying process is written, an area 31-2 in which an application software is written, and an area 31-3 in which a data base is written.

An area 32 for storing a password and a space address in which error data (false data) is written is provided in part of the area 31-1 in which the starting program is written. In the area 32, a desired password, the space address of error data and other information as required are stored by use of the non-use area of the redundancy space. Further, areas 33-1, 33-2 in which error data items are written by use of the non-use areas of the redundancy space are provided in part of the data base area 31-3. An area 34 lying near the final address FFF is a non-use area of the memory space.

Figure 5:
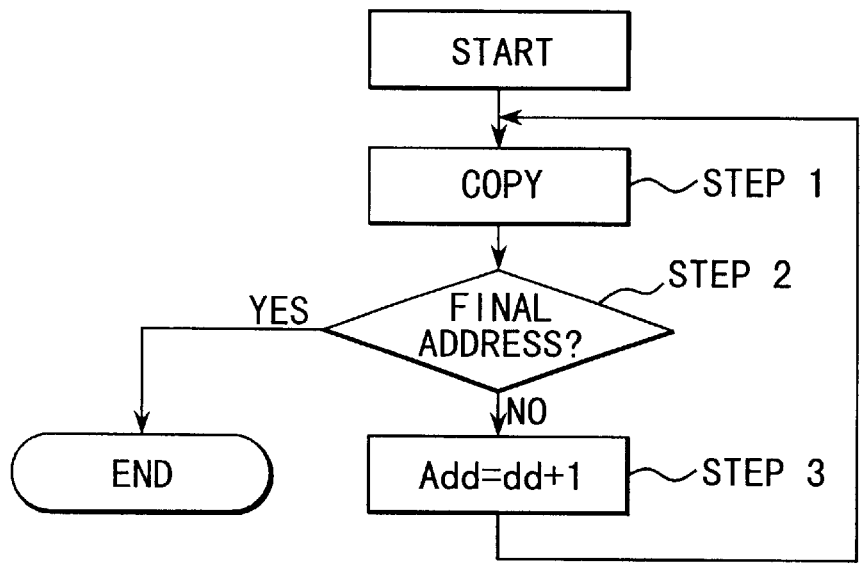
FIG. 5 is a flowchart for illustrating the operation when the memory space shown in FIG. 3 is illegally copied.

FIG. 4 is a flowchart for illustrating a regular copying method when the memory space 31 (data base area 31-3) shown in FIG. 3 is copied, and FIG. 5 is a flowchart for illustrating a method for copying the memory space by use of a ROM writer. Further, FIG. 6A is a diagram showing a memory space copied when the copying operation is effected by inputting a correct password by use of the copying method of FIG. 4, and FIG. 6B is a diagram showing a memory space copied when the copying operation is effected by inputting an erroneous password by use of the copying method of FIG. 4 or when the copying operation is effected by use of the copying method of FIG. 5.

First, a case wherein a proper user or maker effects the copying operation is explained. As shown in FIG. 4, when the copying program is started, the initialization process (Add=0) is effected and the copy checking process is effected (step 1), and inputting of a password is requested (step 2). An input password is compared with a password previously stored in the redundancy space (step 3), and if the passwords coincide with each other, the operator is regarded as a proper user and whether or not an accessed address corresponds to a space of error data (false data) is determined (step 4). If the address does not correspond to the space of error data, the copying operation is effected (step 5) and whether or not the copying operation has been effected to the final address is determined (step 6). If it is determined that the address is not the final address, the address is incremented by "1" (Add=Add+1) and the process is returned to the step 4 and the same operation as described above is effected. If it is determined in the step 4 that the address corresponds to the space of error data, the process jumps from the step 4 to the step 6 and whether or not the copying operation has been effected to the final address is determined without effecting the copying operation. If it is determined that the address is not the final address, the address is incremented by "1" and the process is returned to the step 4 to effect the same operation as described above, and if it is determined that the address is the final address, the copying process is terminated.

If it is determined in the step 3 that the passwords do not coincide with each other, the copying operation is effected as it is (step 8). Then, whether or not the copying operation has been effected to the final address is determined (step 9), and if it is determined that the address is not the final address, the address is incremented by "1" (step 10) and the process is returned to the step 8 to effect the same operation as described above, and if it is determined that the address is the final address, the copying process is terminated.

Figures 6A, 6B:
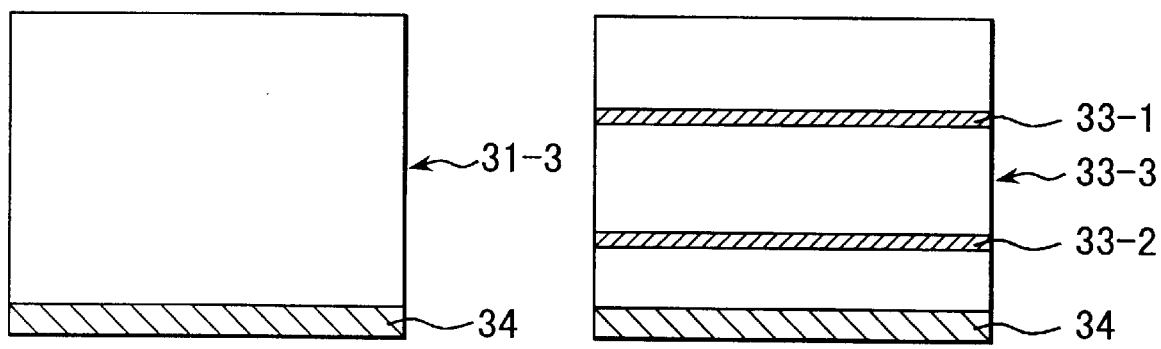
FIG. 6A is a diagram showing a data structure obtained when the memory space shown in FIG. 3 is copied by a regular method.
FIG. 6B is a diagram showing a data structure obtained when the memory space shown in FIG. 3 is illegally copied.

With the above copying method, if the passwords coincide with each other, the space of the error data is not copied as shown in FIG. 6A and only correct data of the data base area 31-3 of FIG. 3 is selectively copied. On the other hand, if the passwords do not coincide with each other, all of the data in the data base area 31-3 is copied as shown in FIG. 6B. Since correct data and erroneous data are contained together in the copied data of the data base area 31-3, the correct operation cannot be attained if the copied data is used and thus the copied data cannot be substantially used.

FIG. 5 is a flowchart for illustrating the operation when the memory space 31 shown in FIG. 3 is copied by use of a ROM writer. In this case, when the copying operation is started (step 1), the copying operation is repeatedly effected while determining whether or not the final address is reached (step 2) and incrementing the address by "1" (step 3). Then, the copying process is terminated when it is determined that the final address is reached.

In the copying operation using the ROM writer, normally, the data base area 31-3 is sequentially copied from the first address to the final address by sequentially incrementing the address by "1", and therefore, erroneous data items 33-1, 33-2 are copied together with correct data as shown in FIG. 6B, the correct operation cannot be attained based on the copied data and thus the copied data cannot be substantially used.

As described above, according to this invention, it is possible to provide a semiconductor memory device capable of protecting stored data from illegal copying without increasing the circuit scale and chip occupancy area. Further, it is possible to provide a method for copying stored data in a semiconductor memory device in which copied data cannot be substantially used even if stored data is copied by use of illegal means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A copying preventing method for a mask ROM having electrically programmable redundancy cells, comprising:

a first step of, when a defect is caused in a memory cell array, electrically disconnecting a defective memory cell corresponding to an address of the defect from the memory cell array;

a second stop of electrically writing the same data as data stored in the disconnected memory cell, into the redundancy cells;

a third step of electrically writing the address of the defective memory cell into an address-storing memory cell;

a fourth step of writing error data into non-use cells among the redundancy cells;

a fifth step of attaching access inhibition addresses to the non-use cells in which the error data is written;

a sixth step of, when the address of the defective memory cell written in the address-storing memory cell is accessed, outputting the data from said one of the redundancy cells in which the same data as the data stored in the disconnected memory cell is written; and a seventh step of, when the access inhibition address is accessed, outputting the error data from the corresponding redundancy cell.

2. A copying method for copying stored data in a semiconductor memory device which has a memory space including a first area in which a program for starting a copying process is written, a second area in which an application software is written, and a third area in which a data base is written, and a redundancy space including a fourth area in which, when a defect is caused in a memory cell array, the same data as data that is to be stored in a memory cell corresponding to an address of the defect is written a fifth area in which error data is stored in a non-use area and a sixth area in which a password and a space address of error data are stored in a non-use area, said semiconductor memory device having an address in the first area of the memory space attached to the password and the space address of the error data in the redundancy space and an address in the third area of the memory space attached to the error data, said method comprising:

a first step of starting the program for starting the copying process and effecting the initialization and copy checking processes;

a second step of accepting an input password;

a third step of determining whether or not the input password coincides with password previously stored in the sixth area;

a fourth step of determining whether or not an address to be accessed corresponds to the space of the error data stored in the fifth area by comparing the address to be accessed with the space address of the error data stored in the sixth area, when it is determined in said third step that the input and stored passwords coincide with each other;

a fifth step of effecting the copying process of copying the data stored in the first to fourth areas with reference to the address to be accessed, when it is determined in said fourth step that the address does not correspond to the space of the error data;

a sixth step of determining whether or not the address is a final address when it is determined in said fourth step that the address corresponds to the space of the error data or after the copying process of said fifth step is terminated and terminating the copying process when the address is detected to be a final address;

a seventh step of incrementing the address by "1" when it is determined in said sixth step that the address is not a final address and returning the process to said fourth step;

an eighth step of effecting the copying process of copying the error data stored in the fifth area when it is determined in said third step that the input and stored passwords do not coincide with each other;

a ninth step of determining whether or not the address of the data copied in said eighth step is a final address and terminating the copying process when the address is detected to be a final address; and a tenth step of incrementing the address by "1" when it is determined in said ninth step that the address is not a final address and returning the copying process to said eighth step.

* * * * *